United States Patent
Liu et al.

(10) Patent No.: US 10,981,203 B2
(45) Date of Patent: Apr. 20, 2021

(54) SINGLE-DRIVE BIDIRECTIONAL-CRAWLING PIPE-CLEANING ROBOT

(71) Applicants: China University of Mining and Technology, Jiangsu (CN); XUZHOU ZHIRUN MINING EQUIPMENT SCIENCE AND TECHNOLOGY CO., LTD, Jiangsu (CN)

(72) Inventors: Songyong Liu, Jiangsu (CN); Qizhi Xie, Jiangsu (CN); Hongxiang Jiang, Jiangsu (CN); Hongzhuang Wu, Jiangsu (CN); Cheng Cheng, Jiangsu (CN); Wei Li, Jiangsu (CN); Gang Shen, Jiangsu (CN); Wei Tang, Jiangsu (CN); Houguang Liu, Jiangsu (CN); Jianhua Yang, Jiangsu (CN)

(73) Assignees: China University of Mining and Technology, Xuzhou (CN); Xuzhou Zhirun Mining Equipment Science and Technology Co., Ltd, Xuzhou (CN)

( * ) Notice: Subject to any disclaimer, the term of this patent is extended or adjusted under 35 U.S.C. 154(b) by 0 days.

(21) Appl. No.: 16/076,685

(22) PCT Filed: Nov. 13, 2017

(86) PCT No.: PCT/CN2017/110716
§ 371 (c)(1),
(2) Date: Aug. 8, 2018

(87) PCT Pub. No.: WO2018/205530
PCT Pub. Date: Nov. 15, 2018

(65) Prior Publication Data
US 2020/0384512 A1    Dec. 10, 2020

(30) Foreign Application Priority Data

May 11, 2017 (CN) .......................... 201710328185.2

(51) Int. Cl.
*B08B 9/051* (2006.01)
*B08B 13/00* (2006.01)
(Continued)

(52) U.S. Cl.
CPC .............. *B08B 9/051* (2013.01); *B08B 13/00* (2013.01); *F16L 55/32* (2013.01);
(Continued)

(58) Field of Classification Search
CPC ... E02F 3/205; E03F 9/002; E03F 9/005; B08B 9/051; B08B 9/049; F16L 55/32; F16L 2101/12
(Continued)

(56) References Cited

U.S. PATENT DOCUMENTS

| 5,203,646 A | 4/1993 | Landsberger et al. |
| 9,353,902 B2 * | 5/2016 | Early .................... F16L 55/32 |
| 2012/0090498 A1 * | 4/2012 | Redpath ................ B08B 9/051 |
| | | 104/138.2 |

FOREIGN PATENT DOCUMENTS

CN    102261540 A    11/2011
CN    203594916 U    5/2014
(Continued)

OTHER PUBLICATIONS

CN-106364588-A EspaceNet Translation (Year: 2017).*
(Continued)

*Primary Examiner* — Monica S Carter
*Assistant Examiner* — Makena S Markman
(74) *Attorney, Agent, or Firm* — Foley & Lardner LLP

(57) ABSTRACT

The present invention discloses a single-drive bidirectional-crawling pipe-cleaning robot, including a front body assem-
(Continued)

bly, a transmission assembly, and a rear body assembly. The transmission assembly is driven by a single power source, and a transmission effect of a connecting rod mechanism, a gear mechanism, and an equal-dwell cam mechanism is used to implement alternate retraction and support of the front body assembly and the rear body assembly in a radial direction and a telescopic motion in an axial direction between the front body assembly and the rear body assembly and at the same time implement synchronous rotation of a dredging cutter head, so as to implement bidirectional crawling and pipe cleaning work of the robot along a pipe. The present invention is stable, reliable, compact, and practical, and implements single-drive bidirectional crawling and pipe cleaning in a pipe having a greatly changing pipe diameter, so that the obstacle negotiation performance and adaptability to pipe diameter changes of an in-pipe robot are effectively improved, the endurance of the in-pipe robot is improved, and practical engineering significance in cleaning of a horizontal pipe having a greatly changing pipe diameter is provided.

5 Claims, 9 Drawing Sheets

(51) Int. Cl.
*F16L 55/32* (2006.01)
*F16L 101/12* (2006.01)
*E03F 9/00* (2006.01)
*E02F 3/20* (2006.01)

(52) U.S. Cl.
CPC ........... *B08B 2209/04* (2013.01); *E02F 3/205* (2013.01); *E03F 9/002* (2013.01); *E03F 9/005* (2013.01); *F16L 2101/12* (2013.01)

(58) Field of Classification Search
USPC ..... 134/166 C, 167 C, 168 C, 169 C, 166 R, 134/167 R, 168 R, 169 R
See application file for complete search history.

(56) References Cited

FOREIGN PATENT DOCUMENTS

| | | | |
|---|---|---|---|
| CN | 204934150 U | | 1/2016 |
| CN | 106364588 A | * | 2/2017 |
| CN | 106364588 A | | 2/2017 |
| CN | 106903120 A | | 6/2017 |
| WO | WO 2017052311 A1 | | 3/2017 |

OTHER PUBLICATIONS

International Search Report and Written Opinion of the International Searching Authority with English language translations mailed in International Application No. PCT/CN2017/110716 dated Feb. 8, 2018.

* cited by examiner

SINGLE-DRIVE BIDIRECTIONAL-CRAWLING PIPE-CLEANING ROBOT

BACKGROUND OF THE INVENTION

Technical Field

The present invention relates to the technical field of horizontal pipe-cleaning robots, and in particular, a pipe-cleaning robot that implements single-drive bidirectional crawling in a horizontal pipe having a greatly changing pipe diameter based on a coordination effect of an equal-dwell cam group.

BACKGROUND

In recent years, there are increasing demands for automatic and intelligent pipe cleaning work in the whole world. Currently, cleaning is mainly completed depending on manual labor in China, and involves complex and harsh working environments, high labor intensity, and considerable danger. During the pipe cleaning work, a crawling in-pipe robot has a relatively high traction capability and topographical adaptability and is more suitable for pipe cleaning work. However, most existing pipe cleaning robots and pipe cleaning instruments only have a unidirectional movement capability. During cleaning of a pipe, if a special obstacle keeps the robot from moving forward and the robot cannot move backward either, the robot is stuck in the pipe. For an existing bidirectional-crawling pipe-cleaning robot, a plurality of powers is required to implement bidirectional movement and pipe cleaning. The control of the plurality of sources of power is complex. Therefore, for such cases that a robot encounters an obstacle and cannot move back or there are a large number of drivers, a stable, reliable, compact, and practical single-drive bidirectional-crawling pipe-cleaning robot is researched and developed based on actual conditions, so as to provide a basis for implementing flexible dredging in a horizontal pipe.

SUMMARY OF THE INVENTION

Inventive objective: To overcome the deficiencies that exist in the prior art, the present invention provides a single-drive bidirectional-crawling pipe-cleaning robot. A coordination effect of an equal-dwell cam group is used to implement single-drive bidirectional crawling and pipe cleaning in a horizontal pipe having a greatly changing pipe diameter, thereby effectively improving the obstacle negotiation performance of a in-pipe robot and the adaptability to pipe diameter changes.

Technical solution: To achieve the foregoing objective, the technical solution used in the present invention is as follows:

A single-drive bidirectional-crawling pipe-cleaning robot includes a front body assembly, a transmission assembly, and a rear body assembly, where the transmission assembly is driven by a single power source, and a transmission effect of a connecting rod mechanism, a gear mechanism, and an equal-dwell cam mechanism is used to implement alternate retraction and support of the front body assembly and the rear body assembly in a radial direction and a telescopic motion in an axial direction between the front body assembly and the rear body assembly and at the same time implement synchronous rotation of a dredging cutter head, so as to implement bidirectional crawling and pipe cleaning work of the robot along a horizontal pipe.

Preferably, the front body assembly includes a front housing, the dredging cutter head, a front frame, front elastic telescopic arms on an upper side and a lower side, and front elastic supporting wheels on a left side and a right side, where the front housing is sleeved over the front frame and is fixedly connected to the front frame; and the dredging cutter head is disposed on a front side of the front frame, and includes a wheel disc, cutter bars evenly arranged on the wheel disc in a circumferential direction, and dredging blades fixedly connected to the cutter bars;

each of the front elastic telescopic arms (active) includes an elastic rubber pad, a sliding rod, a first pressure spring, a spring stopper, and a roller, and the elastic rubber pad is disposed at a top end of the sliding rod, the first pressure spring is sleeved over the sliding rod, and the spring stopper at the bottom of the sliding rod is used to implement a lower limit of the first pressure spring; a groove leading to the bottom is disposed on a side outer wall of the sliding rod, the roller is mounted at the bottom of the groove through a supporting rod (that is, the roller is offset mounted), and slidable fixation of the supporting rod along the groove is used to implement the adjustment of spacing between the roller and the sliding rod, so as to adapt to radial sizes of different pipe; and the bottom of the front elastic telescopic arm passes through the front housing, and the front housing is used to implement an upper limit of the first pressure spring on the sliding rod; and each of the front elastic supporting wheel (passive) includes a telescopic shaft, a telescopic sleeve sleeved over the telescopic shaft and a wheel disposed at a top end of the telescopic shaft, a second pressure spring connected to the bottom of the telescopic shaft is disposed in the telescopic sleeve, and the second pressure spring is used to implement telescopic movement of the telescopic shaft and the telescopic sleeve, to implement flexible adjustment of the length of the front elastic supporting wheel, so as to adapt to radial sizes of different pipe; and the front elastic supporting wheels are disposed on a left side and a right side of the front housing through the telescopic sleeves.

Preferably, the rear body assembly includes a rear housing, a rear frame, rear elastic telescopic arms on an upper side and a lower side, and rear elastic supporting wheels on a left side and a right side, where the rear housing is sleeved over the rear frame and is fixedly connected to the rear frame; and the structures (including the assembly structure and the connection relationship with the rear housing) of the rear elastic telescopic arms and the rear elastic supporting wheels are respectively the same as those of the front elastic telescopic arms and the front elastic supporting wheels in the front body assembly.

Preferably, the transmission assembly includes a rotary motor, a cutter head driving assembly, a front-drive assembly, a rear-drive assembly, and a middle-drive assembly, where the rotary motor is disposed on a front side of the rear frame, a first spur gear is sleeved over an output shaft of the rotary motor that passes through a front side plate of the rear frame, and the first spur gear abuts a rear side of the front side plate of the rear frame;

the middle-drive assembly includes several guiding mechanisms connecting the front frame and the rear frame, a transmission mechanism, and a crank connecting rod mechanism; and each of the guiding mechanisms includes a guiding rod disposed on a rear side plate of the front frame and a linear bearing disposed on the front side plate of the rear frame, and the sliding fit between the guiding rod and the linear bearing is used to implement telescopic connection between the front frame and the rear frame:

the transmission mechanism includes a sliding shaft and a bearing sleeve matching with each other, a strip-shaped through slot is disposed on a side wall of the bearing sleeve, a cylindrical pin is disposed on a side wall of the sliding shaft, and the sliding fit between the cylindrical pin and the through slot is used to implement synchronous rotation and telescopic sliding of the sliding shaft and the bearing sleeve; an end of the sliding shaft that is located away from the bearing sleeve penetrates the rear side plate of the front frame, two first limit rings are disposed on the sliding shaft, the first limit rings respectively abut a front side and a rear side of the rear side plate of the front frame, and the two first limit rings are used to limit axial sliding of the sliding shaft with respect to the rear side plate of the front frame; an end of the bearing sleeve that is located away from the sliding shaft penetrates the front side plate of the rear frame, a second limit ring and a second spur gear are disposed on the bearing sleeve, the second limit ring abuts a front side of the front side plate of the rear frame, and the second spur gear abuts the rear side of the front side plate of the rear frame; the second limit ring and the second spur gear are used to limit axial sliding of the bearing sleeve with respect to the front side plate of the rear frame, and the second spur gear and the first spur gear are engaged for transmission, so as to implement rotational speed transmission from the output shaft of the rotary motor to the bearing sleeve; and a first bevel gear is sleeved over an end, away from the bearing sleeve, of the sliding shaft, and a second bevel gear is sleeved over an end, away from the sliding shaft, of the bearing sleeve:

the front-drive assembly includes a front rotating shaft, a front equal-dwell cam group, and a third bevel gear disposed in the front frame, and the front equal-dwell cam group and the third bevel gear are sleeved over the front rotating shaft; the third bevel gear and the first bevel gear are engaged for transmission, and actuate synchronous rotation of the front rotating shaft and the front equal-dwell cam group; the front equal-dwell cam group includes two identical front equal-dwell cams (that is, the cams have equal farthest dwell angles and nearest dwell angles), and the two front equal-dwell cams are stacked in a staggered manner by 180°; and the rollers (offset mounted) at the bottom of the front elastic telescopic arms on the upper side and the lower side in the front body assembly are respectively mounted abutting the two front equal-dwell cams, and the two front equal-dwell cams are used to implement synchronous telescopic adjustment of the two front elastic telescopic arms in a radial direction;

the rear-drive assembly includes a rear rotating shaft, a rear equal-dwell cam group, and a fourth bevel gear disposed in the rear frame, and a connection structure of the rear-drive assembly is the same as that of the front-drive assembly; the fourth bevel gear and the second bevel gear are engaged for transmission, and actuate synchronous rotation of the rear rotating shaft and the rear equal-dwell cam group; and the rear equal-dwell cam group includes two identical rear equal-dwell cams, and the two rear equal-dwell cams are used to implement synchronous telescopic adjustment of the two rear elastic telescopic arms in a radial direction;

the cutter head driving assembly includes a fifth bevel gear, a belt transmission mechanism, and a cutter head rotating shaft, the fifth bevel gear and the third bevel gear are engaged for transmission, and actuate rotation of the cutter head rotating shaft through the belt transmission mechanism, and the wheel disc of the dredging cutter head is sleeved over an end of the cutter head rotating shaft that passes through a front side plate of the front frame, so as to implement synchronous rotation of the dredging cutter head; and the crank connecting rod mechanism includes connecting rods and cranks disposed on a left side and a right side of the front frame and the rear frame, and each of the cranks is sleeved over the rear rotating shaft extending outside the rear frame to rotate synchronously with the rear rotating shaft; and an end of each of the connecting rods is hinged on a left/right side plate of the front frame, the other end of the connecting rod is hinged on the crank on the side, and the crank connecting rod mechanism is used to implement telescopic adjustment in an axial direction between the front body assembly and the rear body assembly.

The working principle of the present invention is as follows: First, the in-pipe robot on which a sensor, a camera, and the dredging cutter head are mounted is manually placed in a horizontal pipe. The motor is then controlled to rotate forward. Under a transmission effect of the connecting rod mechanism, the gears, the cams, and the transmission mechanism, front and rear bodies can alternately retract and support in a radial direction, and the dredging cutter head rotates synchronously through mechanism transmission. At the same time, the front and rear bodies make alternate telescopic motions in an axial direction. Through coordination among the movement members, the robot crawls along the pipe and at the same time implements cleaning work. When the in-pipe robot encounters a severe obstacle in the pipe and cannot move forward, the motor is controlled to rotate reversely to enable the robot to move backward to employ other countermeasures.

Preferably, the cutter bars and the dredging blades of the dredging cutter head are both detachable, so as to facilitate repair and replacement of the cutter bars and the dredging blades and reduce costs.

Preferably, a first long slot is opened on the supporting rod, a first threaded hole is opened in the groove, and by threading a fastening bolt through the first long slot into fastening fit with the first threaded hole to implement telescopic adjustment of the supporting rod along the groove, so that the connection is simple and convenient.

Preferably, a second long slot is opened on a side wall of the telescopic sleeve, a second cylindrical pin is disposed on a side wall of the telescopic shaft, and the second cylindrical pin and the second long slot cooperate to limit telescopic movement of the telescopic shaft along the telescopic sleeve, thereby preventing the telescopic shaft from coming off from the telescopic sleeve.

Preferably, farthest dwell angles (consistent with nearest dwell angles) of the front equal-dwell cams (consistent with the rear equal-dwell cams) are less than 180°. A rise angle and a return angle need to be used as transition angles between a farthest dwell angle and a nearest dwell angle of an equal-dwell cam, and therefore, both the farthest and nearest dwell angles of the equal-dwell cam are less than 180°.

Beneficial effects: The single-drive bidirectional-crawling pipe-cleaning robot provided in the present invention has the following advantages with respect to the prior art: One source of power and one set of mechanism are used to implement bidirectional crawling and pipe cleaning in a horizontal pipe having a greatly changing pipe diameter. When a special failure occurs during pipe cleaning and the robot cannot continue moving forward, the robot can turn back to leave a pipe. Therefore, the maneuverability of the in-pipe robot to deal with complex pipe environments is improved. 2. The robot has a more compact and lightweight body, so that the endurance of the in-pipe robot is greatly improved. Moreover, a equal-dwell cam group is used to implement relatively large displacement changes of cam followers, so that the robot has higher pipe diameter adaptability, and has practical engineering significance in cleaning of a horizontal pipe having a relatively large range of diameter changes.

Figure 1:
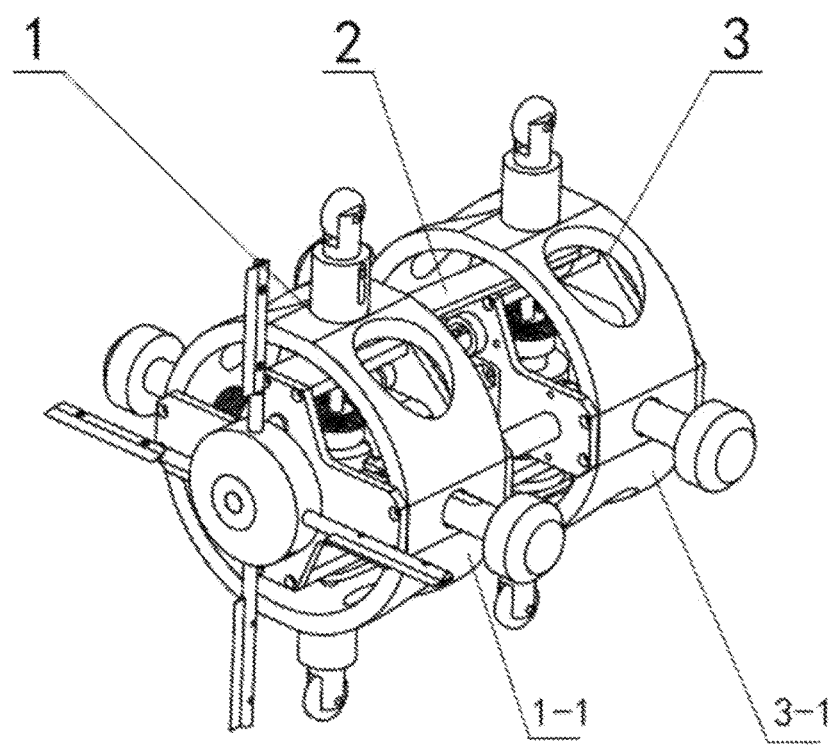
FIG. 1 is an overall schematic structural diagram according to an embodiment of the present invention.

In the drawings: 1, front body assembly, 1-1, front housing. 1-2, dredging cutter head, 1-3, front frame, 1-4, front elastic telescopic arm, 1-5, front elastic supporting wheel, 1-2-1, dredging blade, 1-2-2, cutter bar, 1-2-3, wheel disc, 1-4-1, elastic rubber pad, 1-4-2, sliding rod, 1-4-3, first pressure spring, 1-4-4, spring stopper, 1-4-5, roller, 1-4-6, groove, 1-4-7, supporting rod, 1-5-1, wheel, 1-5-2, telescopic shaft, 1-5-3, telescopic sleeve,

2, transmission assembly, 2-1, cutter head rotating shaft, 2-2, belt transmission mechanism. 2-3, front equal-dwell cam group, 24, guiding rod, 2-5, linear bearing, 2-6, rotary motor, 2-7, first spur gear, 2-8, rear rotating shaft, 2-9, rear equal-dwell cam group, 2-10, fourth bevel gear, 2-11, crank, 2-12, transmission mechanism, 2-13, connecting rod, 2-14, third bevel gear, 2-15, front rotating shaft, 2-16, fifth bevel gear, 2-12-1, first bevel gear, 2-12-2, first limit ring, 2-12-3, sliding shaft, 2-12-4, cylindrical pin, 2-12-5, bearing sleeve, 2-12-6, through slot, 2-12-7, second limit ring, 2-12-8, second spur gear, 2-12-9, second bevel gear,

3, rear body assembly, 3-1, rear housing, 3-2, rear frame, 3-3, rear elastic telescopic arm, and 3-4, rear elastic supporting wheel.

DETAILED DESCRIPTION OF THE INVENTION

The present invention is further described below with reference to the accompanying drawings.

Figure 2:
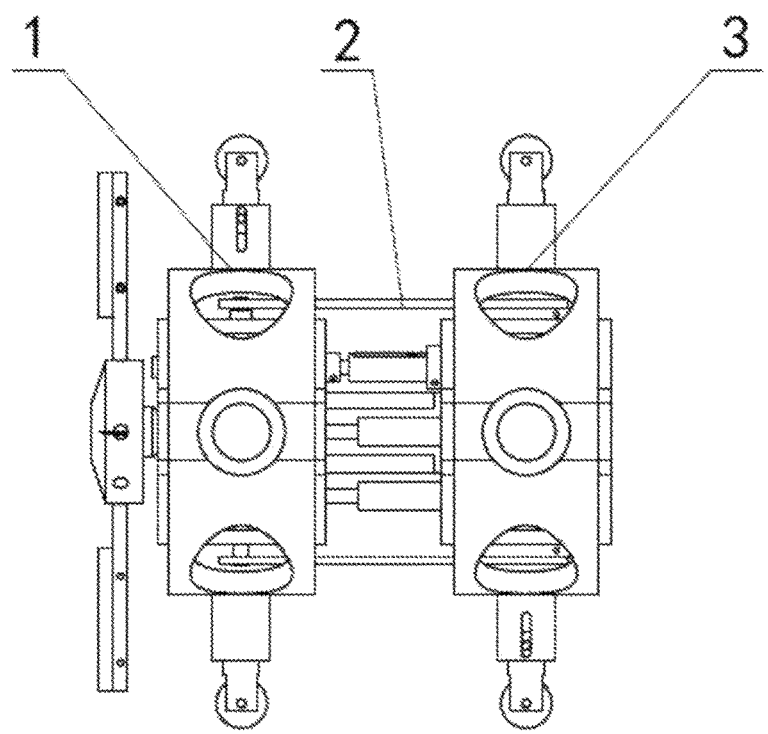
FIG. 2 is a front view according to an embodiment of the present invention.

A single-drive bidirectional-crawling pipe-cleaning robot shown in FIG. 1 and FIG. 2 includes a front body assembly 1, a transmission assembly 2, and a rear body assembly 3.

The transmission assembly 2 is driven by a single power source, and a transmission effect of a connecting rod mechanism, a gear mechanism, and a equal-dwell cam mechanism is used to implement alternate retraction and support of the front body assembly 1 and the rear body assembly 3 in a radial direction and a telescopic motion in an axial direction between the front body assembly 1 and the rear body assembly 3 and at the same time implement synchronous rotation of a dredging cutter head 1-2, so as to implement bidirectional crawling and pipe cleaning work of the robot along a pipe.

Figure 3:
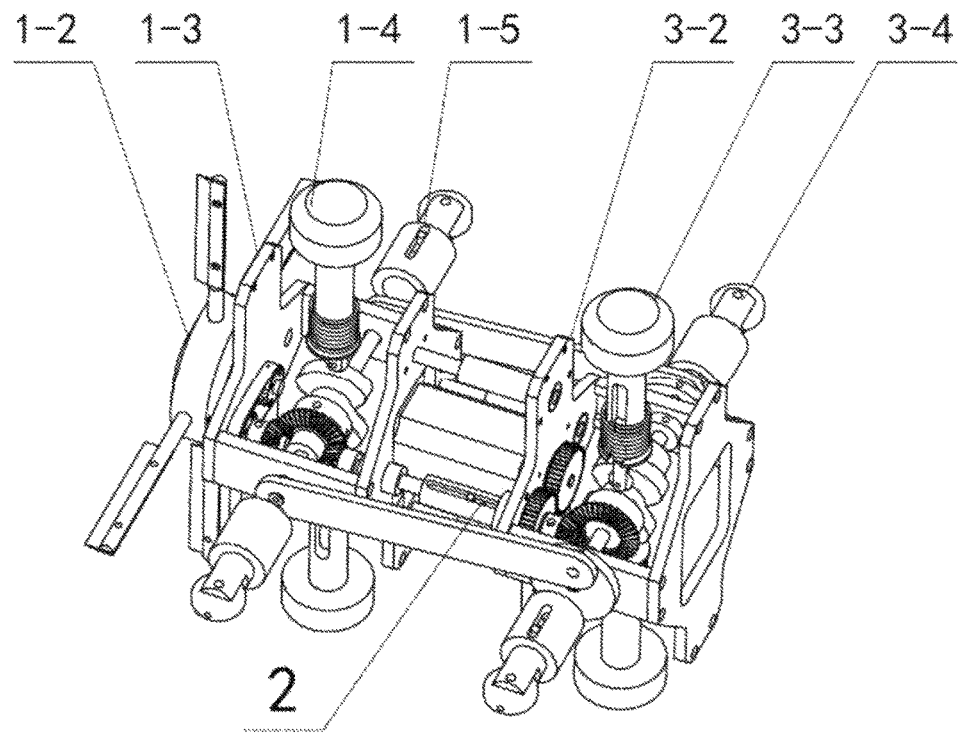
FIG. 3 is a schematic diagram of an internal structure according to an embodiment of the present invention.

As shown in FIG. 3, the front body assembly 1 includes a front housing 1-1, the dredging cutter head 1-2, a front frame 1-3, front elastic telescopic arms 1-4 on an upper side and a lower side, and front elastic supporting wheels 1-5 on a left side and a right side.

Figure 4:
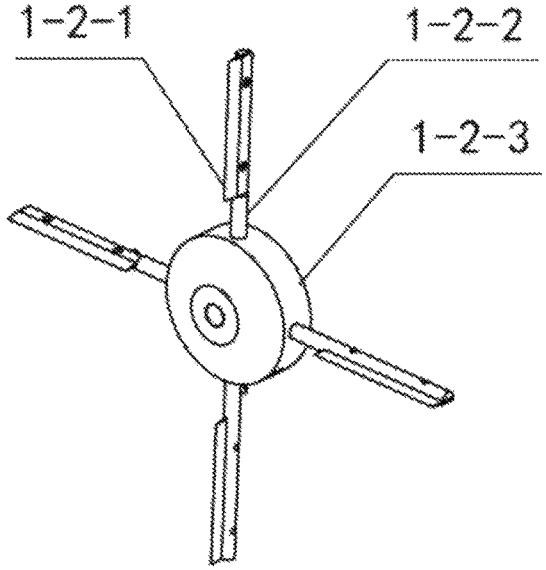
FIG. 4 is a schematic structural diagram of a dredging cutter head according to an embodiment of the present invention.

The front housing 1-1 is sleeved over the front frame 1-3 and is fixedly connected to the front frame 1-3. As shown in FIG. 4, the dredging cutter head 1-2 is disposed on a front side of the front frame 1-3, and includes a wheel disc 1-2-3, cutter bars 1-2-2 evenly arranged on the wheel disc in a circumferential direction 1-2-3, and dredging blades 1-2-1 fixedly connected to the cutter bars 1-2-2.

Figure 5:
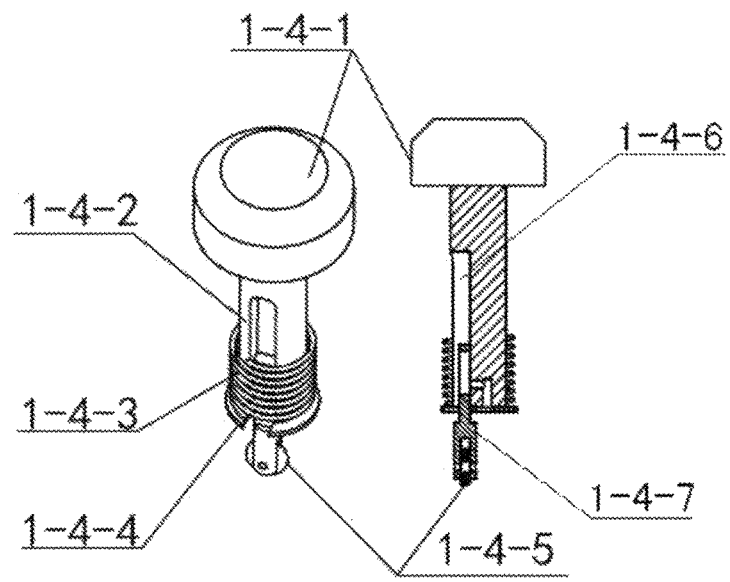
FIG. 5 is a schematic structural diagram of an elastic telescopic arm according to an embodiment of the present invention.

As shown in FIG. 5, each of the front elastic telescopic arms 1-4 includes an elastic rubber pad 1-4-1, a sliding rod 1-4-2, a first pressure spring 1-4-3, a spring stopper 1-4-4, and a roller 1-4-5, and the elastic rubber pad 1-4-1 is disposed at a top end of the sliding rod 1-4-2. The first pressure spring 1-4-3 is sleeved over the sliding rod 1-4-2, and the spring stopper 1-4-4 at the bottom of the sliding rod 1-4-2 is used to implement a lower limit of the first pressure spring 1-4-3. A groove 1-4-6 leading to the bottom is disposed on a side outer wall of the sliding rod 1-4-2, the roller 1-4-5 is mounted at the bottom of the groove 1-4-6 through a supporting rod 1-4-7, and slidable fixation of the supporting rod 1-4-7 along the groove 1-4-6 is used to implement the adjustment of spacing between the roller 1-4-5 and the sliding rod 1-4-2, so as to adapt to radial sizes of different pipe. The bottom of the front elastic telescopic arm 1-4 passes through the front housing 1-1, and the front housing 1-1 is used to implement an upper limit of the first pressure spring 1-4-3 on the sliding rod 1-4-2.

Figure 6:
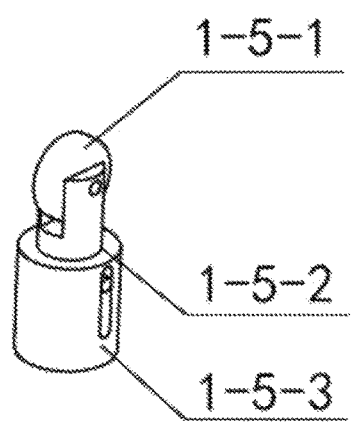
FIG. 6 is a schematic structural diagram of an elastic supporting wheel according to an embodiment of the present invention.

As shown in FIG. 6, each of the front elastic supporting wheels 1-5 includes a telescopic shaft 1-5-2, a telescopic sleeve 1-5-3 sleeved over the telescopic shaft 1-5-2 and a wheel 1-5-1 disposed at a top end of the telescopic shaft 1-5-2, a second pressure spring connected to the bottom of the telescopic shaft 1-5-2 is disposed in the telescopic sleeve 1-5-3, and the second pressure spring is used to implement telescopic movement of the telescopic shaft 1-5-2 and the telescopic sleeve 1-5-3, so as to adapt to radial sizes of different pipe. The front elastic supporting wheels 1-5 are disposed on a left side and a right side of the front housing 1-1 through the telescopic sleeves 1-5-3.

In this embodiment, the rear body assembly 3 includes a rear housing 3-1, a rear frame 3-2, rear elastic telescopic arms 3-3 on an upper side and a lower side, and rear elastic supporting wheels 3-4 on a left side and a right side. The rear housing 3-1 is sleeved over the rear frame 3-2 and is fixedly connected to the rear frame 3-2. The structures (including the assembly structure and the connection relationship with the rear housing 3-1) of the rear elastic telescopic arms 3-3 and the rear elastic supporting wheels 3-4 are respectively the same as those of the front elastic telescopic arms 1-4 and the front elastic supporting wheels 1-5 in the front body assembly 1 (identical universal components are used in the front and rear).

Figure 7:
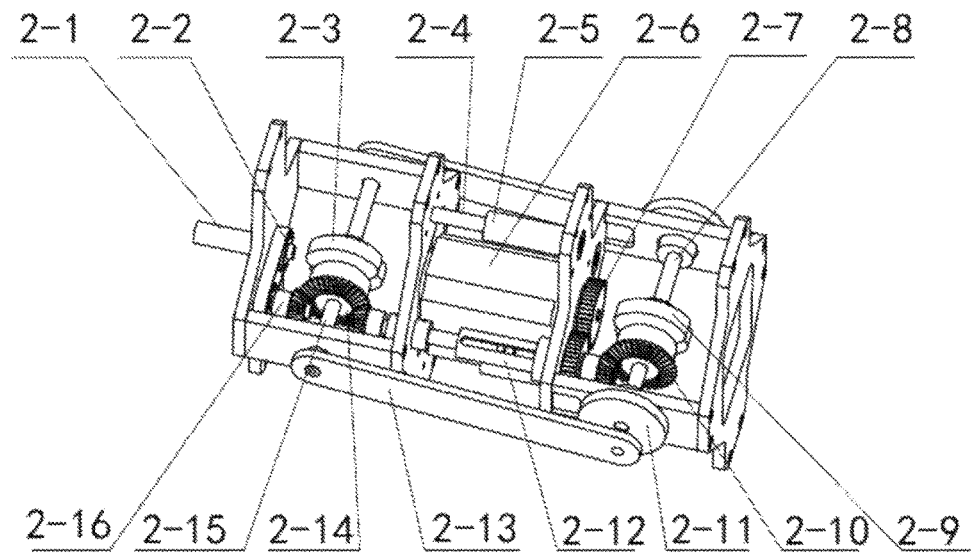
FIG. 7 is a schematic structural diagram of a transmission assembly according to an embodiment of the present invention.
Figure 8:
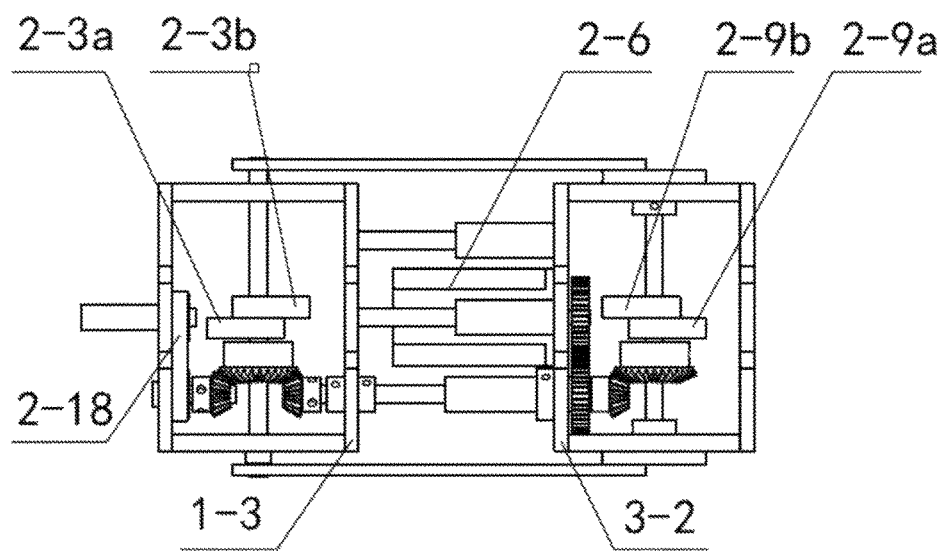
FIG. 8 is a top view of a transmission assembly according to an embodiment of the present invention.

As shown in FIG. 7 and FIG. 8, the transmission assembly 2 includes a rotary motor 2-6, a cutter head driving assembly, a front-drive assembly, a rear-drive assembly, and a middle-drive assembly.

The rotary motor 2-6 is disposed on a front side of the rear frame 3-2, a first spur gear 2-7 is sleeved over an output shaft of the rotary motor 2-6 that passes through a front side plate of the rear frame 3-2, and the first spur gear 2-7 abuts a rear side of the front side plate of the rear frame 3-2.

The middle-drive assembly includes several guiding mechanisms connecting the front frame 1-3 and the rear frame 3-2, a transmission mechanism 2-12, and a crank connecting rod mechanism. Each of the guiding mechanisms includes a guiding rod 2-4 disposed on a rear side plate of the front frame 1-3 and a linear bearing 2-5 disposed on the front side plate of the rear frame 3-2. The sliding fit between the guiding rod 2-4 and the linear bearing 2-5 is used to implement telescopic connection between the front frame 1-3 and the rear frame 3-2.

Figure 12:
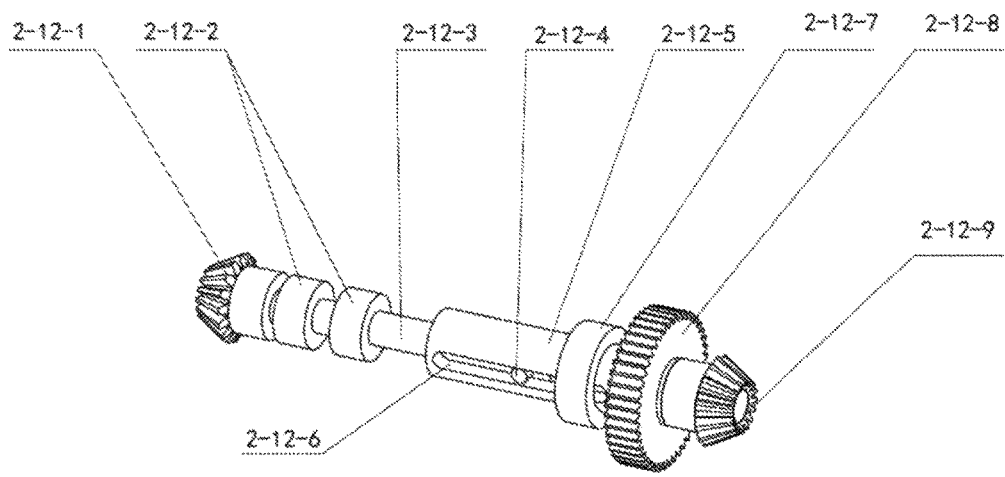
FIG. 12 is a schematic structural diagram of a transmission mechanism according to an embodiment of the present invention.
Figure 13:
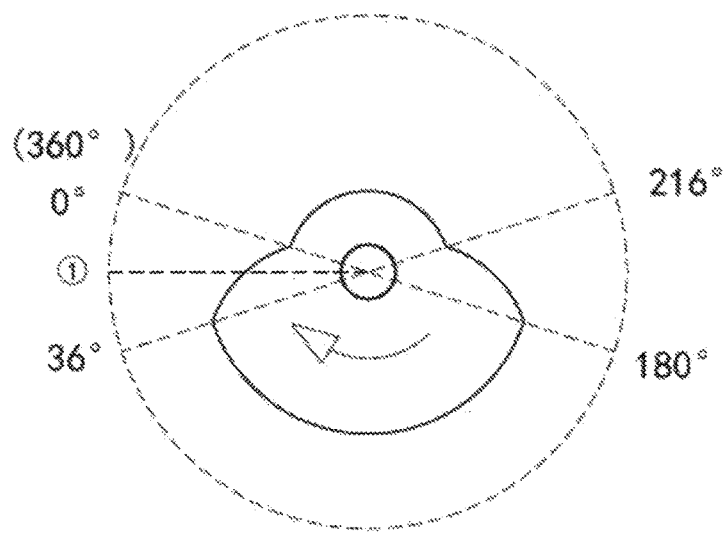
FIG. 13 is a diagram of a rotational angle position of a rear equal-dwell cam according to an embodiment of the present invention.
Figure 14:
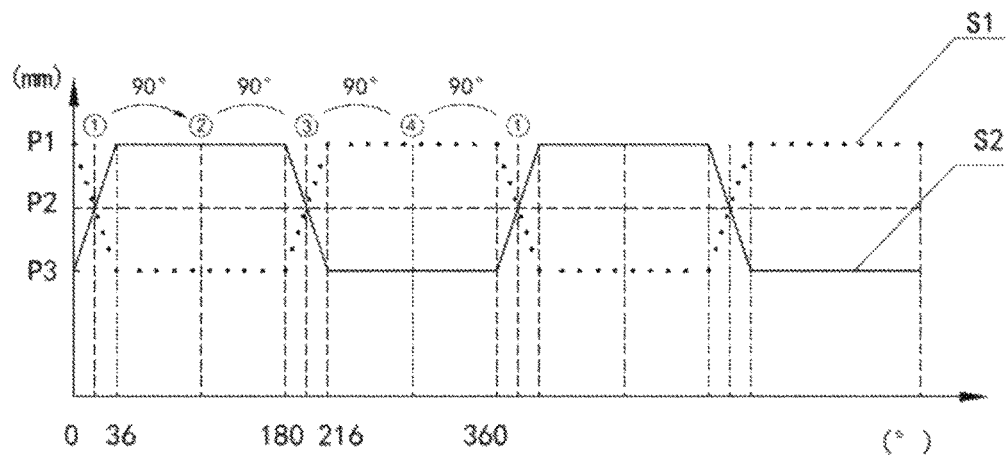
FIG. 14 is a diagram showing changes of a supporting states of front and rear bodies along with a rotational angle of a cam according to an embodiment of the present invention.

As shown in FIG. 12, the transmission mechanism 2-12 includes a sliding shaft 2-12-3 and a bearing sleeve 2-12-5 matching with each other a strip-shaped through slot 2-12-6 is disposed on a side wall of the bearing sleeve 2-12-5, a cylindrical pin 2-12-4 is disposed on a side wall of the sliding shaft 2-12-3, and the sliding fit between the cylindrical pin 2-12-4 and the through slot 2-12-6 is used to implement synchronous rotation and telescopic sliding of the sliding shaft 2-12-3 and the bearing sleeve 2-12-5. An end of the sliding shaft 2-12-3 that is located away from the bearing sleeve 2-12-5 penetrates the rear side plate of the front frame 1-3, two first limit rings 2-12-2 are disposed on the sliding shaft 2-12-3, the first limit rings 2-12-2 respectively abut a front side and a rear side of the rear side plate of the front frame 1-3, and the two first limit rings 2-12-2 are used to limit axial sliding of the sliding shaft 2-12-3 with respect to the rear side plate of the front frame 1-3. An end of the bearing sleeve 2-12-5 that is located away from the sliding shaft 2-12-3 penetrates the front side plate of the rear frame 3-2, a second limit ring 2-12-7 and a second spur gear 2-12-8 are disposed on the bearing sleeve 2-12-5, the second limit ring 2-12-7 abuts a front side of the front side plate of the rear frame 3-2, and the second spur gear 2-12-8 abuts the rear side of the front side plate of the rear frame 3-2. The second limit ring 2-12-7 and the second spur gear 2-12-8 are used to limit axial sliding of the bearing sleeve 2-12-5 with respect to the front side plate of the rear frame 3-2, and the second spur gear 2-12-8 and the first spur gear 2-7 are engaged for transmission, so as to implement rotational speed transmission from the output shaft of the rotary motor 2-6 to the bearing sleeve 2-12-5. A first bevel gear 2-12-1 is sleeved over an end, away from the bearing sleeve 2-12-5, of the sliding shaft 2-12-3, and a second bevel gear 2-12-9 is sleeved over an end, away from the sliding shaft 2-12-3, of the bearing sleeve 2-12-5.

Figure 9:
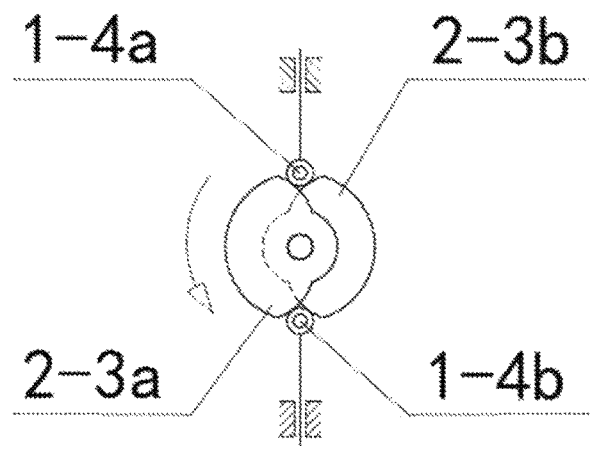
FIG. 9 and FIG. 10 are respectively brief diagrams of transmission of a front equal-dwell cam group and a rear equal-dwell cam group according to an embodiment of the present invention.

The front-drive assembly includes a front rotating shaft 2-15, a front equal-dwell cam group 2-3, and a third bevel gear 2-14 disposed in the front frame 1-3, and the front equal-dwell cam group 2-3 and the third bevel gear 2-14 are sleeved over the front rotating shaft 2-15. The third bevel gear 2-14 and the first bevel gear 2-12-1 are engaged for transmission, and actuate synchronous rotation of the front rotating shaft 2-15 and the front equal-dwell cam group 2-3. As shown in FIG. 9, the front equal-dwell cam group 2-3 includes two identical front equal-dwell cams 2-3a, 2-3b, and the two front equal-dwell cams are stacked in a staggered manner by 180°. The rollers 1-4-5 at the bottom of the front elastic telescopic arms 1-4a, 1-4b on the upper side and the lower side in the front body assembly 1 are respectively mounted abutting the two front equal-dwell cams 2-3a, 2-3b, and the two front equal-dwell cams are used to implement synchronous telescopic adjustment of the two front elastic telescopic arms 1-4 in a radial direction.

Figure 10:
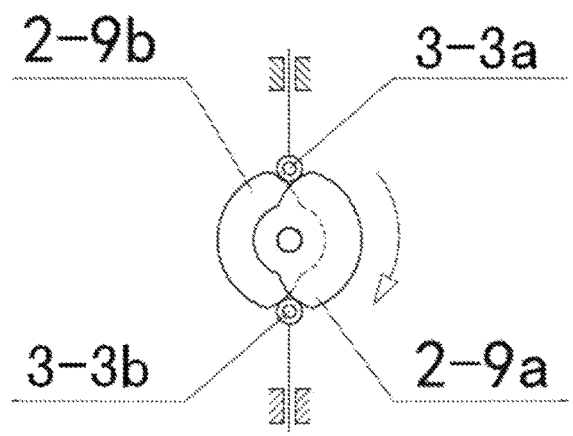

The rear-drive assembly includes a rear rotating shaft 2-8, a rear equal-dwell cam group 2-9, and a fourth bevel gear 2-10 disposed in the rear frame 3-2, and a connection structure of the rear-drive assembly is the same as that of the front-drive assembly (identical universal components are used in the front and rear). The fourth bevel gear 2-10 and the second bevel gear 2-12-9 are engaged for transmission, and actuate synchronous rotation of the rear rotating shaft 2-8 and the rear equal-dwell cam group 2-9. As shown in FIG. 10, the rear equal-dwell cam group 2-9 includes two identical rear equal-dwell cams 2-9a. 2-9b, and the two rear equal-dwell cams are used to implement synchronous telescopic adjustment of the two rear elastic telescopic arms 3-3a, 3-3b in a radial direction. During rotation of the transmission mechanism 2-12, engaged transmission of a bevel gear set at the same time drives reverse equal-speed rotation of the front-drive assembly and the rear-drive assembly, to enable the front equal-dwell cam group 2-3 and the rear equal-dwell cam group 2-9 to perform reverse equal-speed rotation.

The cutter head driving assembly includes a fifth bevel gear 2-16, a belt transmission mechanism 2-2, and a cutter head rotating shaft 2-1, the fifth bevel gear 2-16 and the third bevel gear 2-14 are engaged for transmission, and actuate rotation of the cutter head rotating shaft 2-1 through the belt transmission mechanism 2-2, and the wheel disc 1-2-3 of the dredging cutter head 1-2 is sleeved over an end of the cutter head rotating shaft 2-1 that passes through a front side plate of the front frame 1-3, so as to implement synchronous rotation of the dredging cutter head 1-2.

Figure 11:
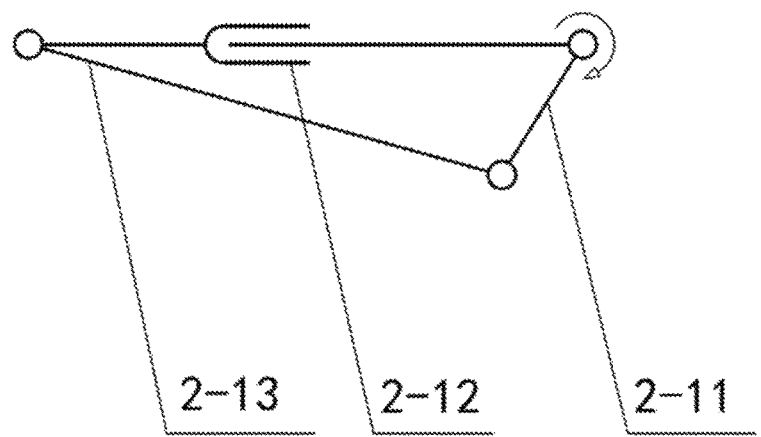
FIG. 11 is a brief diagram of movement of a crank connecting rod mechanism according to an embodiment of the present invention.

As shown in FIG. 11, the crank connecting rod mechanism includes connecting rods 2-13 and cranks 2-11 disposed on a left side and a right side of the front frame 1-3 and the rear frame 3-2, and each of the cranks 2-11 is sleeved over the rear rotating shaft 2-8 extending outside the rear frame 3-2 to rotate synchronously with the rear rotating shaft 2-8. An end of each of the connecting rods 2-13 is hinged on a left/right side plate of the front frame 1-3, the other end of the connecting rod 2-13 is hinged on the crank 2-11 on the side, and the crank connecting rod mechanism is used to implement telescopic adjustment in an axial direction between the front body assembly 1 and the rear body assembly 3.

In this embodiment, the cutter bars 1-2-2 and the dredging blades 1-2-1 of the dredging cutter head 1-2 are both detachable.

In this embodiment, a first long slot is opened on the supporting rod 1-4-7, a first threaded hole is opened in the groove 1-4-6, and by threading a fastening bolt through the first long slot into fastening fit with the first threaded hole to implement telescopic adjustment of the supporting rod 1-4-7 along the groove 1-4-6.

In this embodiment, a second long slot is opened on a side wall of the telescopic sleeve 1-5-3, a second cylindrical pin is disposed on a side wall of the telescopic shaft 1-5-2, and the second cylindrical pin and the second long slot cooperate to limit telescopic movement of the telescopic shaft 1-5-2 along the telescopic sleeve 1-5-3.

In this embodiment, farthest dwell angles and nearest dwell angles of the equal-dwell cams 2-3a, 2-3b, 2-9a, 2-9b are all 144°, and rise angles and return angles of the equal-dwell cams 2-3a, 2-3b, 2-9a, 2-9b are both 36°. A equal-dwell cam is used in the present invention. A nearest dwell angle and a farthest dwell angle of the cam are equal and are both less than 180°. Therefore, under the premise that an allowable pressure angle is not exceeded, the present invention has a larger radial support range compared with the case of a variable-dwell cam, has higher adaptability to pipe diameter changes, and is therefore more applicable to cleaning of a horizontal pipe having a greatly changing pipe diameter. The farthest and nearest dwell angles of a equal-dwell cam in the present invention are not limited to this specific angle, provided that the values of the farthest and nearest dwell angles are equal.

Figure 15A:
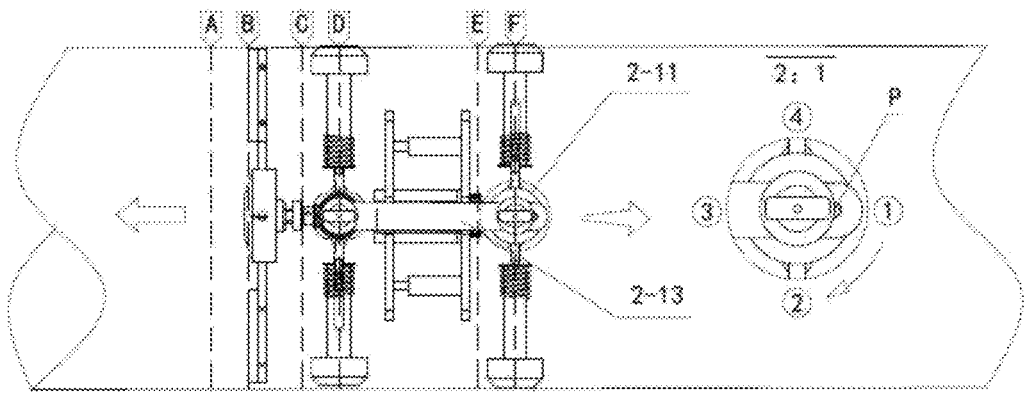
FIG. 15a to FIG. 15e are diagrams showing a movement procedure of a robot along a horizontal pipe according to an embodiment of the present invention.

A specific implementation manner of the present invention is as follows:

A movement process of the in-pipe robot is shown in FIG. 13, FIG. 14, and FIG. 15a to FIG. 15e. According to the change of a rotational angle position of a rear equal-dwell cam in FIG. 13, S1 and S2 in FIG. 14 respectively represent radial supporting states of a front body and a rear body. For ease of description, the robot is divided into three parts, which are respectively a front body B1 (a telescopic motion in a radial direction), a middle body B2 (a telescopic motion in an axial direction), and a rear body B3 (a telescopic motion in a radial direction). At the same time, the telescopic states of the parts have three extension degrees, which are respectively a fully-extended state, a middle state, and a fully-retracted state. The fully-retracted state in a radial direction has no effect of supporting a pipe wall, the middle state in a radial direction has a weak effect of supporting the pipe wall, and the fully-extended state in a radial direction has a strong effect of supporting the pipe wall. The movement process of the in-pipe robot is specifically described as follows:

First step: The crank 2-11 rotates clockwise by 0°. As shown in FIG. 15a, in this case, the hinge hole on the crank 2-11 is in Position 1. As can be seen from FIG. 14, the front body B1 is in a middle state in the radial direction, the middle body B2 is in a fully-retracted state in the axial direction, and the rear body B3 is in a middle state in the radial direction.

Figure 15B:
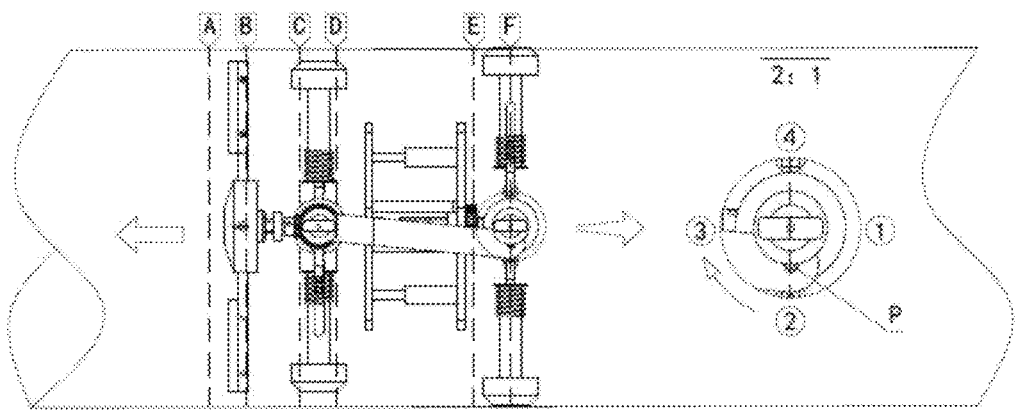

Second step: The crank 2-11 rotates clockwise by 90°. As shown in FIG. 15b, in this case, the hinge hole on the crank 2-11 is in Position 2. As can be seen from FIG. 14, the front body B1 is in a fully-retracted state in the radial direction, the middle body B2 is in a middle state in the axial direction, and the rear body B3 is in a fully-extended state in the radial direction.

Figure 15C:
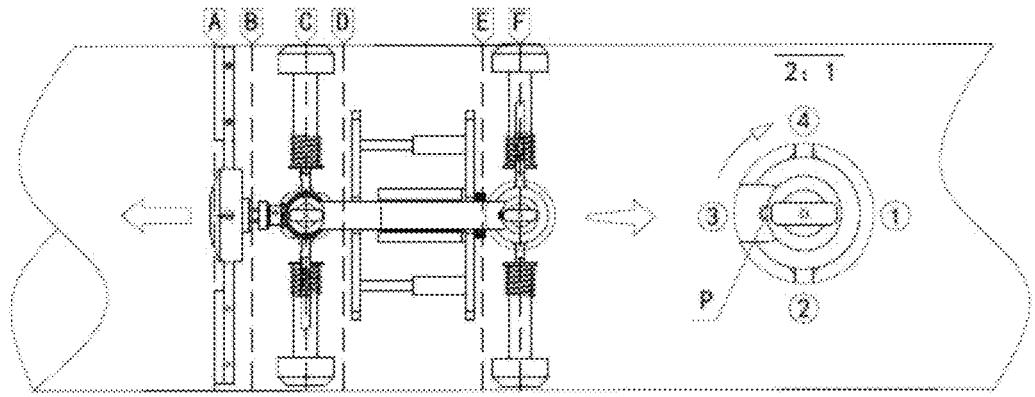

Third step: The crank 2-11 rotates clockwise by 180°. As shown in FIG. 15c, in this case, the hinge hole on the crank 2-11 is in Position 3. As can be seen from FIG. 14, the front body B1 is in a middle state in the radial direction, the middle body B2 is in a fully-extended state in the axial direction, and the rear body B3 is in a middle state in the radial direction.

Figure 15D:
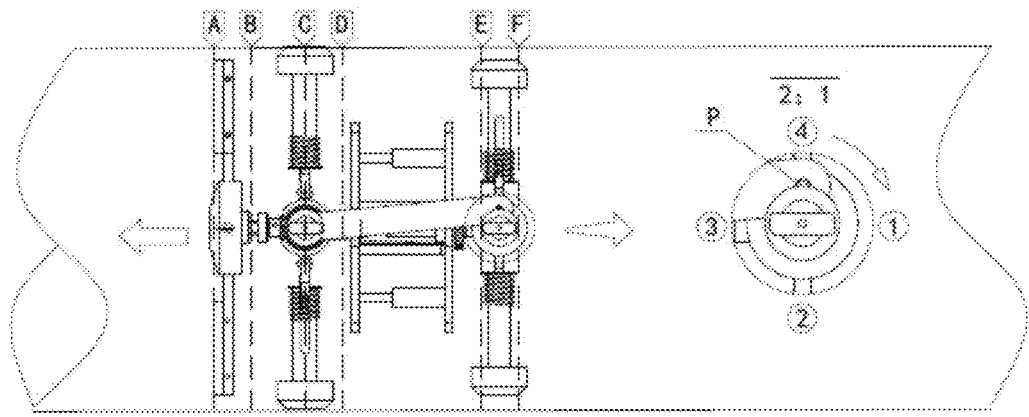

Fourth step: The crank 2-11 rotates clockwise by 270°. As shown in FIG. 15d, in this case, the hinge hole on the crank 2-11 is in Position 4. As can be seen from FIG. 14, the front body B1 is in a fully-extended state in the radial direction, the middle body B2 is in a middle state in the axial direction, and the rear body B3 is in a fully-retracted state in the radial direction.

Figure 15E:
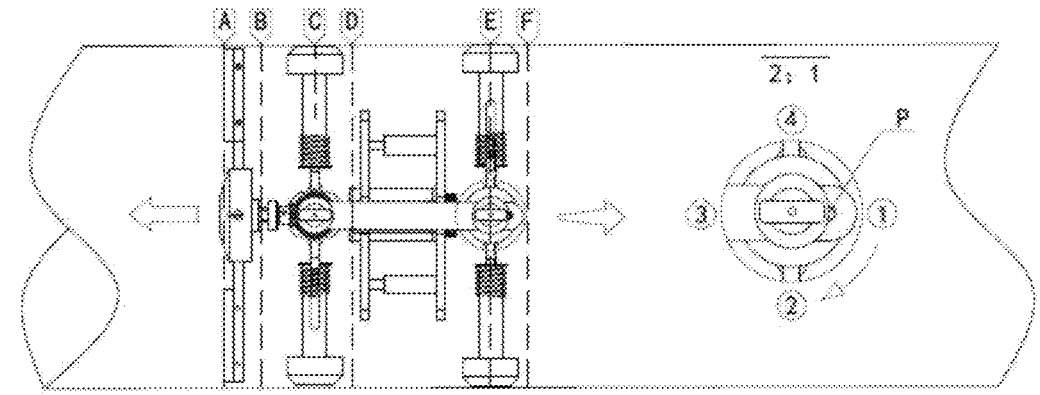

Fifth step: The crank 2-1 rotates clockwise by 360°. As shown in FIG. 15e, in this case, the hinge hole on the crank 2-11 returns to Position 1. As can be seen from FIG. 14, the front body B1 is in a middle state in the radial direction, the middle body B2 is in a fully-retracted state in the axial direction, and the rear body B3 is in a middle state in the radial direction.

By observing the reference lines (A to F) in FIG. 15a to FIG. 15e, the process in which the in-pipe robot crawls leftward along a horizontal pipe can be clearly observed.

In the present invention, the connecting rod mechanism, the gear transmission, and the equal-dwell cam mechanism are combined, that is, a single power source and one set of mechanism are used to implement the retraction and extension of the front and rear bodies of the robot in a radial direction and the increase and decrease of the spacing between the front and rear bodies, so as to implement bidirectional crawling and pipe cleaning in a horizontal pipe having a greatly changing diameter. The present invention has a bidirectional movement capability and a relatively large range of radial support, has higher topographical adaptability, and has practical engineering significance in pipe cleaning.

The foregoing is merely preferred implementation manners of the present invention. It should be noted that a person of ordinary skill in the art may further make several improvements and modifications without departing from the principle of the present invention, and these improvements and modifications shall be construed as falling within the protection scope of the present invention.

What is claimed is:

1. A single-drive bidirectional-crawling pipe-cleaning robot comprising a front body assembly (1), a transmission assembly (2), and a rear body assembly (3), wherein:

the transmission assembly (2) is driven by a single power source, and a transmission effect of a connecting rod mechanism, a gear mechanism, and a equal-dwell cam mechanism is used to implement alternate retraction and support of the front body assembly (1) and the rear body assembly (3) in a radial direction and a telescopic motion in an axial direction between the front body assembly (1) and the rear body assembly (3) and at the same time implement synchronous rotation of a dredging cutter head (1-2), such that the robot achieves bidirectional crawling and pipe cleaning along a horizontal pipe;

the single-drive bidirectional-crawling pipe-cleaning robot further characterized in that, the front body assembly (1) comprises a front housing (1-1), the dredging cutter head (1-2), a front frame (1-3), front elastic telescopic arms (1-4) on an upper side and a lower side, and front elastic supporting wheels (1-5) on a left side and a right side, wherein the front housing (1-1) is sleeved over the front frame (1-3) and is fixedly connected to the front frame (1-3); and the dredging cutter head (1-2) is disposed on a front side of the front frame (1-3), and comprises a wheel disc (1-2-3), cutter bars (1-2-2) evenly arranged on the wheel disc in a circumferential direction (1-2-3), and dredging blades (1-2-1) fixedly connected to the cutter bars (1-2-2);

each of the front elastic telescopic arms (1-4) comprises an elastic rubber pad (1-4-1), a sliding rod (1-4-2), a first pressure spring (1-4-3), a spring stopper (1-4-4), and a roller (1-4-5), and the elastic rubber pad (1-4-1) is disposed at a top end of the sliding rod (1-4-2); the first pressure spring (1-4-3) is sleeved over the sliding rod (1-4-2), and the spring stopper (1-4-4) at the bottom of the sliding rod (1-4-2) is used to implement a lower limit of the first pressure spring (1-4-3); a groove (1-4-6) leading to the bottom is disposed on a side outer wall of the sliding rod (1-4-2), the roller (1-4-5) is mounted at the bottom of the groove (1-4-6) through a supporting rod (1-4-7), and a slidable fixation of the supporting rod (1-4-7) along the groove (1-4-6) is used to implement the adjustment of spacing between the roller (1-4-5) and the sliding rod (1-4-2); and the bottom of the front elastic telescopic arm (1-4) passes through the front housing (1-1), and the front housing (1-1) is used to implement an upper limit of the first pressure spring (1-4-3) on the sliding rod (1-4-2);

each of the front elastic supporting wheels (1-5) comprises a telescopic shaft (1-5-2), a telescopic sleeve (1-5-3) sleeved over the telescopic shaft (1-5-2) and a wheel (1-5-1) disposed at a top end of the telescopic shaft (1-5-2), a second pressure spring connected to the bottom of the telescopic shaft (1-5-2) is disposed in the telescopic sleeve (1-5-3), and the second pressure spring is used to implement telescopic movement of the telescopic shaft (1-5-2) and the telescopic sleeve (1-5-3); and the front elastic supporting wheels (1-5) are disposed on a left side and a right side of the front housing (1-1) through the telescopic sleeves (1-5-3);

the rear body assembly (3) comprises a rear housing (3-1), a rear frame (3-2), rear elastic telescopic arms (3-3) on an upper side and a lower side, and rear elastic supporting wheels (3-4) on a left side and a right side, wherein the rear housing (3-1) is sleeved over the rear frame (3-2) and is fixedly connected to the rear frame (3-2); and the structures of the rear elastic telescopic arms (3-3) and the rear elastic supporting wheels (3-4) are respectively the same as those of the front elastic telescopic arms (1-4) and the front elastic supporting wheels (1-5) in the front body assembly (1);

transmission assembly (2) comprises a rotary motor (2-6), a cutter head driving assembly, a front-drive assembly, a rear-drive assembly, and a middle-drive assembly, wherein the rotary motor (2-6) is disposed on a front side of the rear frame (3-2), a first spur gear (2-7) is sleeved over an output shaft of the rotary motor (2-6) that passes through a front side plate of the rear frame (3-2), and the first spur gear (2-7) abuts a rear side of the front side plate of the rear frame (3-2);

the middle-drive assembly comprises several guiding mechanisms connecting the front frame (1-3) and the rear frame (3-2), a transmission mechanism (2-12), and a crank connecting rod mechanism; and each of the guiding mechanisms comprises a guiding rod (2-4) disposed on a rear side plate of the front frame (1-3) and a linear bearing (2-5) disposed on the front side plate of the rear frame (3-2), and a sliding fit between the guiding rod (2-4) and the linear bearing (2-5) is used to implement telescopic connection between the front frame (1-3) and the rear frame (3-2);

the transmission mechanism (2-12) comprises a sliding shaft (2-12-3) and a bearing sleeve (2-12-5) matching with each other, a strip-shaped through slot (2-12-6) is provided on a side wall of the bearing sleeve (2-12-5), a cylindrical pin (2-12-4) is disposed on a side wall of the sliding shaft (2-12-3), and a sliding fit between the cylindrical pin (2-12-4) and the through slot (2-12-6) is used to implement synchronous rotation and telescopic sliding of the sliding shaft (2-12-3) and the bearing sleeve (2-12-5); an end of the sliding shaft (2-12-3) that is located away from the bearing sleeve (2-12-5) penetrates the rear side plate of the front frame (1-3), two first limit rings (2-12-2) are disposed on the sliding shaft (2-12-3), the first limit rings (2-12-2) respectively abut a front side and a rear side of the rear side plate of the front frame (1-3), and the two first limit rings (2-12-2) are used to limit axial sliding of the sliding shaft (2-12-3) with respect to the rear side plate of the front frame (1-3); an end of the bearing sleeve (2-12-5) that is located away from the sliding shaft (2-12-3) penetrates the front side plate of the rear frame (3-2), a second limit ring (2-12-7) and a second spur gear (2-12-8) are disposed on the bearing sleeve (2-12-5), the second limit ring (2-12-7) abuts a front side of the front side plate of the rear frame (3-2), and the second spur gear (2-12-8) abuts the rear side of the front side plate of the rear frame (3-2); the second limit ring (2-12-7) and the second spur gear (2-12-8) are used to limit axial sliding of the bearing sleeve (2-12-5) with respect to the front side plate of the rear frame (3-2), and the second spur gear (2-12-8) and the first spur gear (2-7) are engaged for transmission; and a first bevel gear (2-12-1) is sleeved over the end of the sliding shaft (2-12-3) that is located away from the bearing sleeve (2-12-5), and a second bevel gear (2-12-9) is sleeved over the end of the bearing sleeve (2-12-5) that is located away from the sliding shaft (2-12-3);

the front-drive assembly comprises a front rotating shaft (2-15), a front equal-dwell cam group (2-3), and a third bevel gear (2-14) disposed in the front frame (1-3), and the front equal-dwell cam group (2-3) and the third bevel gear (2-14) are sleeved over the front rotating shaft (2-15); the third bevel gear (2-14) and the first bevel gear (2-12-1) are engaged for transmission, and actuate synchronous rotation of the front rotating shaft (2-15) and the front equal-dwell cam group (2-3); the front equal-dwell cam group (2-3) comprises two identical front equal-dwell cams, and the two front equal-dwell cams are stacked in a staggered manner by 180°; and the rollers (1-4-5) at the bottom of the front elastic telescopic arms (1-4) on the upper side and the lower side in the front body assembly (1) are respectively mounted abutting the two front equal-dwell cams, and the two front equal-dwell cams are used to implement synchronous telescopic adjustment of the two front elastic telescopic arms (1-4) in a radial direction;

the rear-drive assembly comprises a rear rotating shaft (2-8), a rear equal-dwell cam group (2-9), and a fourth bevel gear (2-10) disposed in the rear frame (3-2), and a connection structure of the rear-drive assembly is the same as that of the front-drive assembly; the fourth bevel gear (2-10) and the second bevel gear (2-12-9) are engaged for transmission, and actuate synchronous rotation of the rear rotating shaft (2-8) and the rear equal-dwell cam group (2-9);

and the rear equal-dwell cam group (2-9) comprises two identical rear equal-dwell cams, and the two rear equal-dwell cams are used to implement synchronous telescopic adjustment of the two rear elastic telescopic arms (3-3) in a radial direction;

the cutter head driving assembly comprises a fifth bevel gear (2-16), a belt transmission mechanism (2-2), and a cutter head rotating shaft (2-1), the fifth bevel gear (2-16) and the third bevel gear (2-14) are engaged for transmission, and actuate rotation of the cutter head rotating shaft (2-1) through the belt transmission mechanism (2-2), and the wheel disc (1-2-3) of the dredging cutter head (1-2) is sleeved over an end of the cutter head rotating shaft (2-1) that passes through a front side plate of the front frame (1-3); and the crank connecting rod mechanism comprises connecting rods (2-13) and cranks (2-11) disposed on a left side and a right side of the front frame (1-3) and the rear frame (3-2), and each of the cranks (2-11) is sleeved over the rear rotating shaft (2-8) extending outside the rear frame (3-2) to rotate synchronously with the rear rotating shaft (2-8); and an end of each of the connecting rods (2-13) is hinged on a left/right side plate of the front frame (1-3), the other end of the connecting rod (2-13) is hinged on the crank (2-11) on the same side, and the crank connecting rod mechanism is used to implement telescopic adjustment in an axial direction between the front body assembly (1) and the rear body assembly (3).

2. The single-drive bidirectional-crawling pipe-cleaning robot according to claim 1, wherein the cutter bars (1-2-2) and the dredging blades (1-2-1) of the dredging cutter head (1-2) are both detachable.

3. The single-drive bidirectional-crawling pipe-cleaning robot according to claim 1, wherein a first long slot is opened on the supporting rod (1-4-7), a first threaded hole is opened in the groove (1-4-6), and by threading a fastening bolt through the first long slot into fastening fit with the first threaded hole, telescopic adjustment of the supporting rod (1-4-7) along the groove (1-4-6) is implemented.

4. The single-drive bidirectional-crawling pipe-cleaning robot according to claim 1, wherein a second long slot is opened on a side wall of the telescopic sleeve (1-5-3), a second cylindrical pin is disposed on a side wall of the telescopic shaft (1-5-2), and the second cylindrical pin and the second long slot cooperate to limit telescopic movement of the telescopic shaft (1-5-2) along the telescopic sleeve (1-5-3).

5. The single-drive bidirectional-crawling pipe-cleaning robot according to claim 1, wherein farthest dwell angles of the front equal-dwell cams are less than 180°.

\* \* \* \* \*